United States Patent
Tsujimoto et al.

(10) Patent No.: US 9,617,436 B2
(45) Date of Patent: Apr. 11, 2017

(54) WATER-BASED INK COMPOSITION AND MARKING PEN

(71) Applicant: ZEBRA CO., LTD., Shinjuku-ku, Tokyo (JP)

(72) Inventors: Mayuko Tsujimoto, Tokyo (JP); Makoto Ugajin, Tokyo (JP); Motoko Ishida, Tokyo (JP)

(73) Assignee: ZEBRA CO., LTD., Shinjuku-Ku, Tokyo (JP)

( * ) Notice: Subject to any disclaimer, the term of this patent is extended or adjusted under 35 U.S.C. 154(b) by 49 days.

(21) Appl. No.: 14/077,910

(22) Filed: Nov. 12, 2013

(65) Prior Publication Data

US 2014/0186093 A1    Jul. 3, 2014

(30) Foreign Application Priority Data

Dec. 27, 2012 (JP) ................................. 2012-285676

(51) Int. Cl.

| | |
|---|---|
| *B43K 7/00* | (2006.01) |
| *B43K 8/03* | (2006.01) |
| *A61K 8/11* | (2006.01) |
| *C09D 11/16* | (2014.01) |
| *A61Q 1/00* | (2006.01) |
| *B43K 7/10* | (2006.01) |
| *B43K 5/00* | (2006.01) |
| *B43K 8/00* | (2006.01) |
| *B43K 8/02* | (2006.01) |
| *B43K 8/04* | (2006.01) |

(52) U.S. Cl.
CPC ............. *C09D 11/16* (2013.01); *B43K 8/003* (2013.01); *B43K 8/02* (2013.01); *B43K 8/04* (2013.01)

(58) Field of Classification Search
CPC .......... C09D 11/16; B43K 8/003; B43K 8/04
USPC ............................... 401/195–199; 106/31.25
See application file for complete search history.

(56) References Cited

U.S. PATENT DOCUMENTS

| | | | | |
|---|---|---|---|---|
| 4,145,148 A | * | 3/1979 | Fukuoka ................ | B43K 7/105 401/199 |
| 5,621,021 A | * | 4/1997 | Yoshioka ............... | C09D 11/16 106/31.63 |
| 5,629,363 A | * | 5/1997 | Abber .................... | B43K 1/082 401/215 |
| 7,070,352 B2 | * | 7/2006 | Iida ........................ | B43K 5/005 401/192 |

(Continued)

FOREIGN PATENT DOCUMENTS

| | | |
|---|---|---|
| JP | 2002030235 A | 1/2002 |
| JP | 2002069340 A | 3/2002 |

(Continued)

OTHER PUBLICATIONS

"SB (styrene butadiene) latex Catalog", JSR Corporation, URL : http://www.jsr.co.jp/pd/em_sb.shtml, Sep. 5, 2016.

(Continued)

*Primary Examiner* — Mark A Laurenzi
*Assistant Examiner* — Thomas M Abebe
(74) *Attorney, Agent, or Firm* — Cantor Colburn LLP

(57) ABSTRACT

A water-based ink composition is described. The water-based ink composition includes a latex containing styrene-butadiene rubber particles, and a coloring agent, the glass transition temperature of the styrene-butadiene rubber particles being 10° C. to 50° C.

8 Claims, 1 Drawing Sheet

(56) References Cited

U.S. PATENT DOCUMENTS

| | | | | |
|---|---|---|---|---|
| 7,208,036 | B2* | 4/2007 | Fukuo | B43K 8/02 |
| | | | | 106/31.65 |
| 7,441,976 | B2* | 10/2008 | Kitaoka | B43K 7/00 |
| | | | | 106/31.13 |
| 8,053,045 | B2* | 11/2011 | Choi | B41M 5/5254 |
| | | | | 428/32.21 |
| 8,222,313 | B2* | 7/2012 | Iftime | C09D 11/101 |
| | | | | 106/31.13 |
| 8,403,579 | B2* | 3/2013 | Kitaoka | B43K 7/02 |
| | | | | 106/31.13 |
| 2005/0143486 | A1* | 6/2005 | Yoshimura | C09D 11/18 |
| | | | | 523/160 |
| 2005/0148685 | A1* | 7/2005 | Yamamoto | A61K 8/19 |
| | | | | 523/160 |
| 2005/0227050 | A1* | 10/2005 | Nagashima | B41M 1/18 |
| | | | | 428/195.1 |
| 2007/0203259 | A1* | 8/2007 | Kurihara | C09D 11/18 |
| | | | | 401/209 |
| 2009/0326109 | A1* | 12/2009 | Kameda | B60C 1/0016 |
| | | | | 524/110 |
| 2010/0062194 | A1* | 3/2010 | Sun | B42D 25/387 |
| | | | | 428/29 |
| 2011/0274477 | A1* | 11/2011 | Nakatani | B43K 1/08 |
| | | | | 401/147 |
| 2012/0029431 | A1* | 2/2012 | Hwang | A61M 5/14248 |
| | | | | 604/151 |
| 2012/0269752 | A1* | 10/2012 | Ozee | A61K 8/042 |
| | | | | 424/63 |
| 2014/0118451 | A1* | 5/2014 | Nakane | C08F 2/50 |
| | | | | 347/102 |
| 2014/0186093 | A1* | 7/2014 | Tsujimoto | B43K 8/003 |
| | | | | 401/196 |

FOREIGN PATENT DOCUMENTS

| | | |
|---|---|---|
| JP | 2003034768 A | 2/2003 |
| JP | 2003155434 A | 5/2003 |
| JP | 2003277670 A | 10/2003 |
| JP | 2004026926 A | 1/2004 |
| JP | 2005008873 A | 1/2005 |
| JP | 2006083267 A | 3/2006 |
| JP | 2006206640 A | 8/2006 |
| JP | 2006225627 A | 8/2006 |
| JP | 2006263984 A | 10/2006 |
| JP | 2007084807 A | 4/2007 |
| JP | 2010150331 A | 7/2010 |
| JP | 2010228405 A | 10/2010 |
| WO | 03091037 A1 | 11/2003 |

OTHER PUBLICATIONS

Japanese Notification of Information Provision for Patent Application No. 2012-285676; Date of Mailing: Jan. 4, 2017, with English translation.

\* cited by examiner

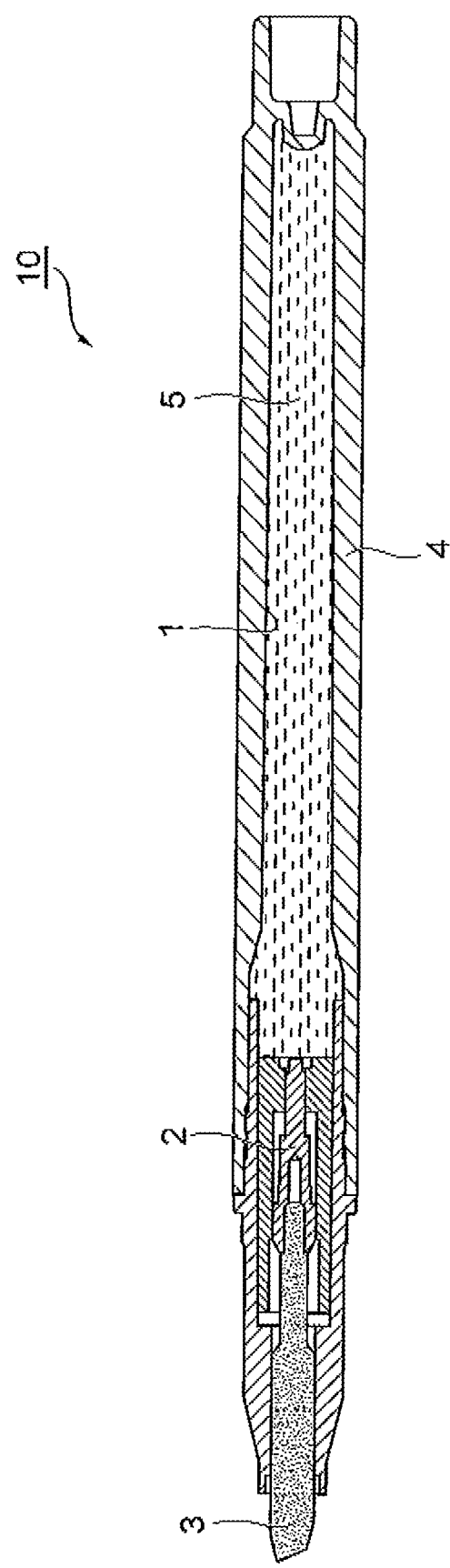

WATER-BASED INK COMPOSITION AND MARKING PEN

The present invention claims priority under 35 U.S.C. §119 to Japanese Application No. 2012-285676 filed Dec. 27, 2012, the entire content of which is incorporated herein by reference.

TECHNICAL FIELD

The present invention relates to a water-based ink composition and a marking pen.

BACKGROUND

Marking pens such as fluorescent markers serve primarily for highlighting of specific sections of interest. Thus, the coloring property of a marking pen is an important characteristic for increasing the visibility of writing lines and making target locations stand out. However, marking pens with excellent coloring properties have had a problem in that drawn writing lines have been undesirably visible from the back sides of the papers (show-through). This problem of show-through is notable when writing on thin papers of dictionaries and the like, or papers that have low density and are highly permeable to ink. Examples of marking pens designed to reduce show-through include marking pens using the water-based ink compositions described in Japanese Unexamined Patent Application Publication No. 2010-150331 and Japanese Unexamined Patent Application Publication No. 2006-206640. However, marking pens that are resistant to show-through usually have limited ink discharge, and their coloring properties are also limited. Thus, such marking pens tend to be insufficient in terms of either or both reduced show-through and coloring properties.

Solid fluorescent markers are also known that comprise solid inks with increased ink viscosity. However, while solid fluorescent markers are resistant to show-through, they have poor coloring properties compared to fluorescent markers using liquid inks, and are also associated with problems such as difficult marking at target locations and high variation in line widths because of the crayon-like writing mechanism, such that the original function of the fluorescent marker cannot be satisfactorily exhibited.

SUMMARY

It is an object of the present invention, which has been accomplished in light of the aforementioned problems of the prior art, to provide a water-based ink composition that can reduce show-through from paper surfaces while having satisfactory coloring properties on writing lines, and that also allows drawing of distinct writing lines with a glossy quality; as well as a marking pen employing the composition.

In order to achieve the object stated above, the invention provides a water-based ink composition comprising a latex containing styrene-butadiene rubber particles, and a coloring agent, the glass transition temperature of the styrene-butadiene rubber particles being 0° C. to 50° C.

According to the water-based ink composition of the invention, it is possible to obtain a marking pen that is resistant to show-through and that can form writing lines with excellent coloration and gloss.

The content of the styrene-butadiene rubber particles is preferably 15 to 30 mass % based on the total mass of the water-based ink composition.

The mean particle size of the styrene-butadiene rubber particles is preferably 100 to 200 nm.

The invention further provides a marking pen comprising a pen tip made of a fiber core or plastic core, and an ink reservoir, wherein the water-based ink composition is housed in the ink reservoir.

According to the invention it is possible to provide a marking pen, and a water-based ink composition, that are resistant to show-through and that can form writing lines with excellent coloration and gloss, even when writing on thin papers such as dictionaries or low-density, highly permeable papers.

BRIEF DESCRIPTION OF THE DRAWINGS

The FIGURE is a cross-sectional view of a marking pen according to an embodiment of the invention.

DETAILED DESCRIPTION

Preferred embodiments of the invention will now be explained in detail, with reference to the accompanying drawings as necessary.

(Water-Based Ink Composition)

The water-based ink composition of this embodiment comprises a latex containing styrene-butadiene rubber particles, and a coloring agent. The glass transition temperature of the styrene-butadiene rubber particles is 0° C. to 50° C.

A latex is an emulsion of synthetic rubber particles obtained by emulsion polymerization of monomers such as styrene and butadiene in water. The latex may also refer to a synthetic rubber latex. According to this embodiment, the latex contains styrene-butadiene rubber particles as synthetic rubber particles. Since the water-based ink composition contains this latex, the styrene-butadiene rubber particles in the water-based ink composition dry and fuse together after writing, forming a smooth film. A writing line obtained using the water-based ink composition of this embodiment therefore exhibits gloss. Furthermore, since the water-based ink composition contains the latex, it is possible to prevent permeation of the ink composition through the paper after writing. Thus, satisfactory coloration and gloss are exhibited and show-through can be reduced. With the water-based ink composition of this embodiment, it is possible to obtain a gloss and permeation-blocking effect while inhibiting excessive increase in the water-based ink composition viscosity, to allow its use in marking pens that require reduced ink viscosity.

The styrene-butadiene rubber particles are non-colored particles. The glass transition temperature (hereunder, "Tg") of the styrene-butadiene rubber particles is 0° C. to 50° C. If the Tg of the styrene-butadiene rubber particles is 50° C. or less, fusion will tend to occur between the styrene-butadiene rubber particles when the writing line dries, thus yielding a writing line with excellent gloss. If the Tg of the styrene-butadiene rubber particles is 0° C. or greater, this will tend to minimize stickiness of the writing lines. The upper limit for Tg of the styrene-butadiene rubber particles is preferably 40° C. and more preferably 30° C., from the viewpoint of further increasing the glossy quality of writing lines. The lower limit for Tg is preferably 10° C. and more preferably 20° C. from the viewpoint of the stickiness of writing lines. For the purpose of the present specification, the value of Tg is determined by differential scanning calorimetry.

The mean particle size of the styrene-butadiene rubber particles is preferably 10 to 800 nm, more preferably 50 to 300 nm and even more preferably 100 to 200 nm. If the mean particle size of the styrene-butadiene rubber particles is 10 nm or greater, this will tend to produce a satisfactory effect of show-through resistance and coloring properties. If the mean particle size of the styrene-butadiene rubber particles is 800 nm or less, this will tend to improve the stability over time and facilitate ink discharge. In addition, if the mean particle size of the styrene-butadiene rubber particles is in the range of 10 to 800 nm, the styrene-butadiene rubber particles will more easily fuse and it will be easier to obtain a smooth writing line surface. For the purpose of the present specification, the mean particle size of the polymer particles in the latex is the volume-average particle size. The mean particle size of the polymer particles in the latex can be determined by a known method, such as a method of photographing the dried polymer particles with a transmission electron microscope (photographic method), a method of measuring the turbidity of the latex diluted to a prescribed concentration (turbidity method), a method of irradiating the latex with laser light and measuring the fluctuation of scattered light based on Brownian motion of the polymer particles and performing analysis by photon correlation (dynamic light scattering method), or a method of passing the latex through a capillary tube and performing calculation based on differences in travelling speed in the capillary tube resulting from the particle sizes of the polymer particles (CHDF method).

The surfaces of the styrene-butadiene rubber particles are preferably smooth. If the surfaces of the styrene-butadiene particles are smooth, this will promote smoothness of the writing line surface and facilitate high glossy quality.

The styrene-butadiene rubber particles are particles of a copolymer of styrene and butadiene (styrene-butadiene copolymer), having a copolymerizing component derived from styrene and a copolymerizing component derived from butadiene. The content of the copolymerizing component derived from styrene is preferably 50-85 mol % and more preferably 60-75 mol % based on the total copolymerizing components composing the styrene-butadiene copolymer. The styrene-butadiene copolymer may also have a separate copolymerizing component in addition to the copolymerizing components derived from styrene and butadiene. Separate copolymerizing components in the styrene-butadiene copolymer include copolymerizing components derived from acrylonitrile and the like. When the styrene-butadiene copolymer has such a separate copolymerizing component, the content of the separate copolymerizing component is preferably 1-30 mol %. The styrene-butadiene copolymer may be a random copolymer, a block copolymer or a graft copolymer. The styrene-butadiene copolymer may also be carboxy-modified.

The content of styrene-butadiene rubber particles in the water-based ink composition is preferably 10 to 40 mass % and more preferably 15 to 30 mass %, based on the total mass of the water-based ink composition. If the content of styrene-butadiene rubber particles is 40 mass % or less, this will tend to further improve the ink discharge property. If the content of styrene-butadiene rubber particles is 10 mass % or greater, this will tend to yield satisfactory effects of show-through resistance, coloring properties and glossy quality.

The coloring agent is preferably a pigment, more preferably a fluorescent pigment, and particularly preferably an organic fluorescent pigment. An organic fluorescent pigment consists of resin particles colored with a fluorescent dye. The resin particles may be acrylic resin particles, acrylonitrile-butadiene resin particles or the like.

When the coloring agent is a pigment, the mean particle size (D50), determined by a common method, is preferably 50 to 400 nm and more preferably 100 to 300 nm. If the mean particle size of the pigment is 50 nm or greater, permeation of the ink composition through paper will tend to be inhibited and the effects of show-through resistance, coloring properties and glossy quality will tend to be improved. If the mean particle size of the pigment is 400 nm or less, this will tend to minimize reduction in stability over time and problems with ink discharge from the pen tip.

The content of the coloring agent in the water-based ink composition is preferably 3 to 40 mass % and more preferably 10 to 30 mass % based on the total mass of the of the water-based ink composition. If the content of the coloring agent is 40 mass % or less, this will tend to improve the stability over time. If the content of the coloring agent is 3 mass % or greater, this will tend to improve the coloring properties.

The water-based ink composition of this embodiment may further comprise additives such humectants, preservatives, pH adjusters, surface tension adjusters or the like. Humectants include glycerin, propylene glycol, ethylene glycol and diethylene glycol.

The viscosity of the water-based ink composition is preferably 5-50 mPa·s. Particularly when the water-based ink composition of this embodiment is to be used in a marking pen, the viscosity of the water-based ink composition is preferably 5-20 mPa·s.

(Method for Producing Water-Based Ink Composition)

The water-based ink composition of this embodiment may be obtained by mixing the latex containing the styrene-butadiene rubber particles, the coloring agent, and other additives. There are no particular restrictions on the method of mixing the latex containing styrene-butadiene rubber particles, the coloring agent and the other additives. However, as explained below, when an aqueous dispersion of a pigment is to be used as the coloring agent, preferably the aqueous dispersion of the pigment is introduced first, and then the latex containing the styrene-butadiene rubber particles and the other additives are added and mixed therewith. Introducing the aqueous dispersion of the pigment first will tend to further improve the pigment dispersibility and the dispersion stability.

The nonvolatile content of the latex to be used for production of the water-based ink composition is preferably 35 to 65 mass %. If the nonvolatile content of the latex is 65 mass % or less, this will tend to allow stability over time to be maintained. Also, if the nonvolatile content of the latex is 35 mass % or greater, this will tend to inhibit permeation of the water-based ink composition through papers and to allow show-through resistance and coloring properties to be maintained. The viscosity of the latex is preferably 30-300 mPa·s. If the viscosity of the latex is 300 mPa·s or less, this will tend to lower the viscosity of the water-based ink composition as a whole. Also, if the viscosity of the latex is 30 mPa·s or greater, this will tend to inhibit permeation of the water-based ink composition through papers and to allow show-through resistance and coloring properties to be maintained.

The coloring agent is preferably used as an aqueous dispersion of a pigment during production of the water-based ink composition. The nonvolatile content of the aqueous dispersion is preferably 20 to 50 mass %. If the nonvolatile content of the aqueous dispersion is 20 mass % or greater, this will tend to improve the coloring properties. Also, if the nonvolatile content of the aqueous dispersion is 50 mass % or less, this will tend to improve the stability over time, and will tend to yield satisfactory fluorescence when the coloring agent is a fluorescent pigment.

(Marking Pen)

The marking pen of this embodiment comprises a pen tip made of a fiber core or plastic core, and an ink reservoir, with the water-based ink composition being housed in the ink reservoir.

The FIGURE is a cross-sectional view of a marking pen according to an embodiment of the invention. The marking pen 10 of The FIGURE is a direct-liquid type, but the marking pen of the invention may also be a wadding type. The marking pen 10 comprises an ink reservoir 1, a valve 2, a pen tip 3, a shaft body 4 and a cap (not shown). In the marking pen 10, the space in the shaft body 4 serves as the ink reservoir 1, and the water-based ink composition 5 is housed in the ink reservoir 1. Incidentally, a cylindrical central shaft may be provided inside the shaft body 4, separately from the shaft body 4, and the space inside the central shaft used as the ink reservoir 1. The ink reservoir 1 and the pen tip 3 are connected via the valve 2, and the water-based ink composition 5 in the ink reservoir 1 is supplied to the pen tip 3 through the valve 2.

The pen tip 3 is an ordinary marking pen tip, formed of a fiber core or plastic core to allow supply of the water-based ink composition 5. In the marking pen 10, the end of the pen tip 3 has a chiseled shape with a slanted surface inclined with respect to the center line of the shaft body 4. Contacting the slanted surface of the pen tip 3 with the paper surface allows a writing line to be drawn. The length of the slanted surface in the lengthwise direction in this case is the line width of the writing line. The length of the slanted surface in the lengthwise direction is preferably 2 mm or greater and more preferably 2 to 5 mm, from the viewpoint of easier marking. For the marking pen 10, the end shape of the pen tip 3 is not limited to a chisel shape and may instead be a shell shape or brush pen shape.

The materials forming the valve 2, shaft body 4 and cap, and their shapes are not particularly restricted, and common ones may be applied.

EXAMPLES

The present invention will now be explained in greater detail with reference to examples, with the understanding that the scope of the invention is not to be limited to the examples.

[Preparation of Water-Based Ink Composition]

Example 1

A water-based ink composition was obtained by mixing 50.0 parts by mass of a carboxy-modified styrene-butadiene-based latex (product of Nippon A&L Inc., trade name: NALSTAR SR-100, nonvolatile content: 51 mass %, viscosity: 150 mPa·s, styrene-butadiene rubber particle Tg: 27° C., styrene-butadiene rubber particle mean particle size: 180 nm) as a latex containing styrene-butadiene rubber particles, 29.8 parts by mass of a colored acrylic resin emulsion (product of Nihon Keiko Kagaku, trade name: NKW3205, nonvolatile content: 37 mass %) as an organic fluorescent pigment (coloring agent), 20.0 parts by mass of glycerin (product of NOF Corp.) as a humectant and 0.2 part by mass of a preservative (product of Japan EnviroChemicals, Ltd., trade name: SUROUT 99N). Here, the mean particle size of the styrene-butadiene rubber particles is the particle size determined by the turbidity method.

Examples 2 to 4 and Comparative Examples 1 to 3

Water-based ink compositions were obtained for Examples 2 to 4 and Comparative Examples 1 to 3 in the same manner as Example 1, except that the types and amounts (parts by mass) of materials mixed were changed as shown in Table 1.

The compositions of the water-based ink compositions of Examples 1 to 4 and Comparative Examples 1 to 3, their non-colored particle contents based on the total mass of the water-based ink composition and the water-based ink composition viscosities are summarized in Table 1. The water-based ink composition viscosity is the value measured under the following conditions.

<Viscosity Measurement Conditions>
Apparatus: Rotating viscosimeter
Temperature: 25° C.
Rotational speed: 12 rpm (shear rate: 90 s$^{-1}$)

TABLE 1

|  |  | Example | | | | Comparative Example | | |
|---|---|---|---|---|---|---|---|---|
|  |  | 1 | 2 | 3 | 4 | 1 | 2 | 3 |
| Latex containing non-colored particles | Nalstar SR-100 | 50.0 | 40.0 | — | 50.0 | — | — | — |
|  | Nalstar SR-102 | — | — | 50.0 | — | — | — | — |
|  | Nipol 1571H | — | — | — | — | — | 50.0 | — |
|  | Nipol 1571CL | — | — | — | — | — | — | 50.0 |
| Coloring agent | NKW3205 | 29.8 | 29.8 | 29.8 | — | 29.8 | 29.8 | 29.8 |
|  | SF-3015N | — | — | — | 29.8 | — | — | — |
| Humectant | Glycerin | 20.0 | 20.0 | 20.0 | 20.0 | 20.0 | 20.0 | 20.0 |
| Preservative | Surout 99N | 0.2 | 0.2 | 0.2 | 0.2 | 0.2 | 0.2 | 0.2 |
| Ion-exchanged water |  | 0 | 10 | 0 | 0 | 50 | 0 | 0 |
| Non-colored particle content (mass %) |  | 25.5 | 20.4 | 24.0 | 25.5 | 0 | 20.0 | 19.0 |
| Water-based ink composition viscosity (mPa · s) |  | 17.0 | 9.5 | 12.8 | 17.0 | 3.0 | 10.6 | 8.5 |

The trade names listed in Table 1 are as follows.
NALSTAR SR-100: Latex containing carboxy-modified styrene-butadiene rubber particles, as non colored particles, product of Nippon A&L Inc., nonvolatile content: 51 mass %, viscosity: 150 mPa·s, styrene-butadiene rubber particle Tg: 27° C., styrene-butadiene rubber particle mean particle size: 180 nm.
NALSTAR. SR-102: Latex containing carboxy-modified styrene-butadiene rubber particles, as non-colored particles, product of Nippon A&L Inc., nonvolatile content: 48 mass %, viscosity: 70 mPa·s, styrene-butadiene rubber particle Tg: 21° C., styrene-butadiene rubber particle mean particle size: 200 nm.
NIPOL 1571H: Latex containing carboxy-modified acrylonitrile-butadiene rubber particles, as non-colored particles, product of Zeon Corp., nonvolatile content: 40 mass %, viscosity: 15 mPa·s, acrylonitrile-butadiene rubber particle Tg: −8° C., acrylonitrile-butadiene rubber particle mean particle size: 120 nm.
NIPOL 1571CL: Latex containing acrylonitrile-butadiene rubber particles, as non-colored particles, product of Zeon Corp., nonvolatile content: 38 mass %, viscosity: 12 mPa·s, acrylonitrile-butadiene rubber particle Tg: −11° C., acrylonitrile-butadiene rubber particle mean particle size: 100 nm.

NKW3205: Water-dispersed fluorescent pigment containing acrylic resin-based colored particles (yellow), product of Nihon Keiko Kagaku, nonvolatile content: 37 mass %, acrylic resin-based colored particle mean particle size: 100 nm.

SF-3015N: Water-dispersed fluorescent pigment containing acrylic resin-based colored particles (yellow), product of Sinloihi Co., Ltd., nonvolatile content: 40 mass %, acrylic resin-based colored particle mean particle size: 100 nm.

SUROUT 99N: Nitrogen-containing sulfur-based compound, product of Japan EnviroChemicals, Ltd.

[Evaluation of Water-Based Ink Composition]

Each of the water-based ink compositions obtained in Examples 1 to 4 and Comparative Examples 1 to 3 was filled into the ink reservoir of a marking pen having the structure shown in FIG. 1, and each pen tip was impregnated with the water-based ink composition. A chisel-shaped polyester fiber core was used as the pen tip. The obtained fluorescent marking pen was used for the following evaluation. The evaluation of the water-based ink composition obtained in Example 1 was carried out for a total of five different water-based ink compositions: the water-based ink composition obtained in Example 1, and water-based ink compositions in which the NKW3205 (yellow) in the water-based ink composition was replaced with NKW3207ZE (pink), NKW3204ZE (orange), NKW3208ZE (blue) and NKW3202ZE (green), Evaluation of the water-based ink compositions of Examples 2 to 3 and Comparative Examples 1 to 3 was also carried out for a total of five different water-based ink compositions, similar to Example 1. Also, the evaluation of the water-based ink composition obtained in Example 4 was carried out for a total of four different water-based ink compositions: the water-based ink composition obtained in Example 4, and water-based ink compositions in which the SF-3015N (yellow) in the water-based ink composition was replaced with SF-3017N (pink), SF-3014N (orange) and SF-3022 (green). The evaluation results for the water-based ink compositions are shown in Table 2. The evaluation results in Table 2 are the overall evaluation results for the five or four different water-based ink compositions.

(Show-through Resistance)

Writing was conducted at 7 cm/second on paper with a thickness of 100 μm using fluorescent marking pens with the water-based ink compositions obtained in Examples 1 to 4 and Comparative Examples 1 to 3. Each writing line was observed from the back side of the written paper, and the show-through resistance was evaluated on the following criteria.

A: Writing line was not visible from the back side.
B: Writing line was slightly visible from the back side.
C: Writing line was visible from the back side.

(Coloring Property)

Writing was conducted on high-quality paper using fluorescent marking pens with the water-based ink compositions obtained in Examples 1 to 4 and Comparative Examples 1 to 3. The density of each writing line on the paper surface was observed and the coloring property was evaluated on the following criteria.

A: High density of writing line, excellent coloring property.
B: Somewhat lower writing line density and slightly inferior coloring property, compared to an evaluation of A.
C: Low writing line density, poor coloring property.

(Glossy Quality)

Writing was conducted on high-quality paper using fluorescent marking pens with the water-based ink compositions obtained in Examples 1 to 4 and Comparative Examples 1 to 3. Each writing line on the paper surface was observed and the glossy quality was evaluated on the following criteria.

A: Notable gloss on writing line, which was conspicuous.
B: Gloss on writing line, but slightly lower compared to an evaluation of A.
C: Almost no gloss on writing line.

(Fixing Property)

Writing was conducted on high-quality paper using fluorescent marking pens with the water-based ink compositions obtained in Examples 1 to 4 and Comparative Examples 1 to 3. For evaluation of the fixing property of writing lines on the paper, it was determined whether or not writing lines on the paper could be erased with rubber, based on the following criteria.

A: Writing line could not be erased; excellent fixing property.
B: Writing line could be slightly erased, but the fixing property was somewhat inferior compared to an evaluation of A.
C: Writing line could be erased; poor fixing property.

TABLE 2

|  | Examples | | | | Comparative Examples | | |
| --- | --- | --- | --- | --- | --- | --- | --- |
|  | 1 | 2 | 3 | 4 | 1 | 2 | 3 |
| Show-through resistance | A | A | A | A | C | A | A |
| Coloring property | A | A | A | A | C | A | A |
| Glossy quality | A | A | A | A | C | C | C |
| Fixing property | A | A | A | A | A | A | A |

Based on the evaluation results in Table 2, it was confirmed that the water-based ink compositions obtained in Examples 1 to 4 exhibited both of the reciprocal properties of show-through resistance and coloring property, and allowed drawing of glossy, conspicuous writing lines.

The water-based ink composition of the invention is suitable for writing tools, marking tools and printing tools such as an ink-jet printing tool, and is especially suitable for use in a marking pen.

EXPLANATION OF SYMBOLS

1: Ink reservoir, 2: valve, 3: pen tip, 4: shaft body, 5: water-based ink composition, 10: marking pen.

What is claimed is:

1. A water-based ink composition comprising a latex containing styrene-butadiene rubber particles, and a coloring agent, the glass transition temperature of the styrene-butadiene rubber particles being 10° C. to 50° C.,
   wherein the coloring agent is an organic fluorescent pigment, and a mean particle size of the organic fluorescent pigment is 50 to 400 nm,
   wherein the water-based ink composition when used for writing on paper forms glossy lines which cannot be erased with a rubber eraser.

2. The water-based ink composition according to claim 1, wherein the content of the styrene-butadiene rubber particles is 15 to 30 mass % based on the total mass of the water-based ink composition.

3. The water-based ink composition according to claim 1, wherein the mean particle size of the styrene-butadiene rubber particles is 100 to 200 nm.

4. The water-based ink composition according to claim 2, wherein the mean particle size of the styrene-butadiene rubber particles is 100 to 200 nm.

5. A marking pen comprising a pen tip made of a fiber core or plastic core, and an ink reservoir, wherein a water-based ink composition according to claim 1 is housed in the ink reservoir.

6. The marking pen according to claim 5, wherein the content of the styrene-butadiene rubber particles in the water-based ink composition is 15 to 30 mass % based on the total mass of the water-based ink composition.

7. The marking pen according to claim 5, wherein the mean particle size of the styrene-butadiene rubber particles is 100 to 200 nm.

8. The marking pen according to claim 6, wherein the mean particle size of the styrene-butadiene rubber particles is 100 to 200 nm.

* * * * *